(12) United States Patent
Hayashibara et al.

(10) Patent No.: US 10,965,978 B2
(45) Date of Patent: Mar. 30, 2021

(54) RECORDING DEVICE AND RECORDING METHOD

(71) Applicant: Funai Electric Co., Ltd., Osaka (JP)

(72) Inventors: Kazuki Hayashibara, Osaka (JP); Shojiro Fujimoto, Osaka (JP); Kentaro Takaki, Osaka (JP); Mitsuharu Osaki, Osaka (JP); Koji Fujita, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 0 days.

(21) Appl. No.: 15/430,615

(22) Filed: Feb. 13, 2017

(65) Prior Publication Data

US 2017/0238042 A1 Aug. 17, 2017

(30) Foreign Application Priority Data

Feb. 15, 2016 (JP) .............................. JP2016-025933

(51) Int. Cl.
*H04N 7/173* (2011.01)
*H04N 21/4147* (2011.01)
(Continued)

(52) U.S. Cl.
CPC ....... *H04N 21/4147* (2013.01); *G11B 27/031* (2013.01); *H04N 5/775* (2013.01);
(Continued)

(58) Field of Classification Search
CPC ............... H04N 21/235; H04N 21/435; H04N 21/4331; H04N 21/47202; H04N 7/17318; H04N 7/17336; H04N 7/165; H04N 7/173; H04N 21/4147; H04N 5/775; H04N 21/4335; H04N 21/2385; H04N 21/4263;
(Continued)

(56) References Cited

U.S. PATENT DOCUMENTS 6,275,648 B1 * 8/2001 Knudson ................ H04N 5/782
386/261
6,374,406 B2 * 4/2002 Hirata .................. G06Q 10/107
348/E5.103

(Continued)

FOREIGN PATENT DOCUMENTS

| CN | 1625242 A | 6/2005 |
| EP | 1775947 A1 | 4/2007 |

(Continued)

OTHER PUBLICATIONS

Extended European Search Report of the corresponding European Application No. 17156057.6, dated Jun. 7, 2017.

(Continued)

*Primary Examiner* — Annan Q Shang
(74) *Attorney, Agent, or Firm* — Global IP Counselors, LLP

(57) ABSTRACT

A recording device includes a tuner, a memory, and a controller. The tuner receives broadcast programs. The memory records the broadcast programs via a plurality of recording paths between the tuner and the memory. The controller uses at least two of the recording paths to record a plurality of consecutive broadcast programs on a predetermined channel in the memory. An output of the tuner is inputted to the at least two of the recording paths.

11 Claims, 9 Drawing Sheets

(51) Int. Cl.
  *H04N 21/433* (2011.01)
  *H04N 5/775* (2006.01)
  *H04N 21/4335* (2011.01)
  *G11B 27/031* (2006.01)
  *H04N 21/235* (2011.01)
  *H04N 21/2385* (2011.01)
  *H04N 21/426* (2011.01)
  *H04N 21/458* (2011.01)
  *H04N 21/482* (2011.01)

(52) U.S. Cl.
  CPC ....... *H04N 21/235* (2013.01); *H04N 21/2385* (2013.01); *H04N 21/4263* (2013.01); *H04N 21/4334* (2013.01); *H04N 21/4335* (2013.01); *H04N 21/4583* (2013.01); *H04N 21/4825* (2013.01)

(58) Field of Classification Search
  CPC .......... H04N 21/4583; H04N 21/4825; H04N 21/4334; H04N 21/4383; H04N 21/47214; G11B 27/031
  USPC .... 725/68, 85, 114–116, 131–134, 139–142, 725/151–153
  See application file for complete search history.

(56) References Cited

U.S. PATENT DOCUMENTS

| | | | |
|---|---|---|---|
| 6,782,549 B1 * | 8/2004 | Hasegawa | H04N 5/4401 348/731 |
| 7,552,460 B2 * | 6/2009 | Goldman | H04H 60/39 715/721 |
| 8,676,594 B2 * | 3/2014 | Takushima | G06Q 30/0282 705/1.1 |
| 9,374,628 B2 * | 6/2016 | Woodward | H04N 21/6543 |
| 9,465,996 B1 * | 10/2016 | Greene | H04N 21/4334 |
| 2002/0009285 A1 * | 1/2002 | Safadi | H04N 5/4401 386/295 |
| 2003/0208771 A1 * | 11/2003 | Hensgen | H04N 5/45 725/100 |
| 2004/0172449 A1 * | 9/2004 | Hesselink | H04L 67/02 709/204 |
| 2004/0250281 A1 * | 12/2004 | Feininger | H04N 21/6175 725/58 |
| 2005/0091493 A1 * | 4/2005 | Hirata | H04L 63/0442 713/170 |
| 2005/0213937 A1 * | 9/2005 | Miyazaki | H04N 5/44543 386/241 |
| 2006/0062550 A1 * | 3/2006 | Lee | H04N 5/76 386/296 |
| 2007/0124769 A1 * | 5/2007 | Casey | H04H 20/10 725/46 |
| 2007/0174336 A1 * | 7/2007 | Day | H04N 21/8545 |
| 2007/0186751 A1 * | 8/2007 | Koike | G06F 17/30743 84/609 |
| 2008/0008454 A1 * | 1/2008 | Umesako | G11B 27/034 386/336 |
| 2008/0044158 A1 * | 2/2008 | Kido | H04N 5/76 386/291 |
| 2008/0056680 A1 | 3/2008 | Saeki | |
| 2008/0155608 A1 * | 6/2008 | Han | H04H 60/27 725/58 |
| 2008/0184291 A1 * | 7/2008 | Nozaki | H04N 21/4345 725/38 |
| 2008/0307472 A1 * | 12/2008 | Tanaka | H04N 21/25435 725/102 |
| 2009/0034937 A1 * | 2/2009 | Kusunoki | H04N 21/44008 386/248 |
| 2009/0136206 A1 | 5/2009 | Aisu et al. | |
| 2010/0178025 A1 | 7/2010 | Bhogal et al. | |
| 2010/0199301 A1 * | 8/2010 | Hayashi | H04H 20/33 725/32 |
| 2010/0299681 A1 * | 11/2010 | Maskatia | H04N 5/76 719/328 |
| 2011/0194840 A1 * | 8/2011 | Alexander | H04N 21/4583 386/293 |
| 2013/0021533 A1 * | 1/2013 | Lee | H04N 5/7755 348/725 |
| 2013/0117692 A1 * | 5/2013 | Padmanabhan | H04N 21/4586 715/753 |
| 2013/0283317 A1 * | 10/2013 | Guntupalli | H04N 21/4147 725/44 |
| 2014/0006951 A1 * | 1/2014 | Hunter | H04H 60/31 715/719 |
| 2015/0052568 A1 * | 2/2015 | Glennon | H04N 21/482 725/100 |
| 2015/0128183 A1 * | 5/2015 | Hyeon | H04N 21/44204 725/46 |
| 2016/0007091 A1 * | 1/2016 | Woodward | H04N 21/47214 725/133 |
| 2016/0309227 A1 * | 10/2016 | Casagrande | H04N 21/4147 |
| 2017/0094355 A1 * | 3/2017 | McCarty | H04N 21/44222 |

FOREIGN PATENT DOCUMENTS

| | | |
|---|---|---|
| EP | 2009641 A1 | 12/2008 |
| JP | 2001-351283 A | 12/2001 |
| JP | 2006-216153 A | 8/2006 |
| JP | 2008-148190 A | 6/2008 |
| JP | 2009-224024 A | 10/2009 |
| WO | 2010-111239 A2 | 9/2010 |

OTHER PUBLICATIONS

Anonymous: "White Paper Blu-Ray Disc Rewritable Format: Audio Visual Application Format Specifications for BD-RE Version 2.1", Mar. 31, 2008, XP055007521.

* cited by examiner

FIG. 2

| RECORDING LIST | | | | | | | | |
|---|---|---|---|---|---|---|---|---|
| L1 | L2 | L3 | L4 | L5 | L6 | L7 | L8 | L9 |
| CHANNEL NUMBER | PROGRAM TITLE (ID) | START DATE | START TIME | END TIME | RECORDING SYSTEM | DESIGNATED MODE | ACTUAL MODE | CONVERSION NECESSITY |
| | | | | | | | | |
| | | | | | | | | |
| | | | | | | | | |
| | | | | | | | | |
| | | | | | | | | |
| | | | | | | | | |
| | | | | | | | | |

FIG. 6

TUNER 11a

| | 7:00 AM | 8:00 AM | 9:00 AM | 10:00 AM |
|---|---|---|---|---|
| RECORDING SYSTEM 1 | PROGRAM A (DR MODE) | | PROGRAM C (DR MODE) | |
| RECORDING SYSTEM 2 | | PROGRAM B (DR MODE) | | |

FIG. 7

TUNER 11a

| | 7:00 AM | 8:00 AM | 9:00 AM | 10:00 AM |
|---|---|---|---|---|
| RECORDING SYSTEM 1 | PROGRAM A (DR MODE) | | PROGRAM C (DR MODE) | |
| RECORDING SYSTEM 2 | | PROGRAM B (DR MODE) | | |

| TUNER 11a | 7:00 AM | 8:00 AM | 9:00 AM | 10:00 AM | 11:00 AM |
|---|---|---|---|---|---|
| RECORDING SYSTEM 1 | PROGRAM A (AVC MODE) | | PROGRAM C (AVC MODE) | | |
| RECORDING SYSTEM 2 | | PROGRAM B (DR MODE) | | PROGRAM D (DR MODE) | |

*FIG. 9*

RECORDING DEVICE AND RECORDING METHOD

CROSS-REFERENCE TO RELATED APPLICATIONS

This application claims priority to Japanese Patent Application No. 2016-025933 filed on Feb. 15, 2016. The entire disclosure of Japanese Patent Application No. 2016-025933 is hereby incorporated herein by reference.

BACKGROUND

Field of the Invention

The present invention generally relates to a recording device and a recording method. More specifically, the present invention relates to a recording device having a tuner and a plurality of recording systems.

Background Information

A plurality of broadcast programs are ordinarily recorded individually. However, if broadcast programs are consecutive, then there are situations when recording cannot be performed between broadcast programs due to the need for the processing required at the start and end of the broadcast programs.

Meanwhile, many products that come with functions known as continual recording, loop recording, and so forth have come onto the market in recent years. With such a product, when a channel is specified, all of the broadcast programs are recorded as long as there is enough storage capacity. With such a product, internally each channel is recorded consecutively, and there are not periods in which recording cannot be performed between broadcast programs. The term "broadcast program" refers to the type, content, amount, and layout of the items being broadcast.

In addition, Japanese Laid-Open Patent Application Publication Nos. 2009-224024 and 2001-351283 (Patent Literatures 1 and 2) disclose the recording of broadcast programs that follow one after the other, with no gap in between.

With the recording in Patent Literature 1, if two consecutive broadcast programs are scheduled, then the two broadcast programs are consecutively recorded as a single title, and management information is used to recognize that there are two programs during reproduction.

With the recording in Patent Literature 2, two recorders are used for reliable execution of subsequent scheduled recording during consecutive scheduled recording.

SUMMARY

With a product having a function known as continual recording, loop recording, etc., dedicated parts are sometimes used to expand the simultaneous operation function (such as when continual recording is performed at the same time as the distribution of broadcast programs), and this drives up the cost.

With loop recording, a series of data is produced for each channel. The content titles are divided up by broadcast program, so it takes time and effort to store or copy the desired broadcast programs.

Meanwhile, instead of loop recording that is carried out automatically, if scheduled recording is performed for all of the broadcast programs on a channel that has been specified manually, for instance, then this is nearly the same thing as continual recording. This results in a state in which titles are divided up by broadcast program. However, inevitably the recording of a prior broadcast program ends up being stopped a little early to prepare for the recording of the next broadcast program, which means that the end of a recorded program is cut off. If even a portion is not recorded, then this cannot truly be considered continual recording (loop recording).

Furthermore, there is a limit to the number of scheduled recordings (registration limit of scheduled recordings) with nearly all products. Thus, essentially it is impossible to schedule the recording of all broadcast programs.

Also, with the recording in Patent Literature 1, the recording is not performed for every individual broadcast program, just as with loop recording. Thus, it takes time and effort to store or copy the desired broadcast programs. With the recording in Patent Literature 2, two recording devices are used, which is impractical from a cost standpoint.

One object is to provide continual recording (or loop recording) in which titles are divided up by broadcast program while the recording is not bound to the registration limit of scheduled recordings (or scheduling limit number), and recorded programs are prevented from being cut off abruptly at the end.

In view of the state of the known technology and in accordance with a first aspect of the present invention, the recording device comprises a tuner, a memory, and a controller. The tuner receives broadcast programs. The memory records the broadcast programs via a plurality of recording paths between the tuner and the memory. The controller uses at least two of the recording paths to record consecutive broadcast programs on a predetermined channel in the memory. An output of the tuner is inputted to both of the at least two of the recording paths.

In view of the state of the known technology and in accordance with a second aspect of the present invention, a recording method comprises listing broadcast programs on a predetermined channel in a predetermined time slot within a predetermined time period after a current time, counting a number of broadcast programs that are currently scheduled in a recording list, reducing the predetermined time period for a sum of a number of the broadcast programs that have been listed and the number of broadcast programs that are currently scheduled to fall within a predetermined range when the sum exceeds the predetermined range, adding the broadcast programs that have been listed to the recording list in addition to the broadcast programs that are currently scheduled when the sum falls within the predetermined range, and recording the broadcast programs based on the recording list.

BRIEF DESCRIPTION OF THE DRAWINGS

Referring now to the attached drawings which form a part of this original disclosure:

FIG. 2 is a diagram showing a screen shot of a recording list used in the recording device illustrated in FIG. 1;

FIG. 6 is a schematic diagram of the state when different recording systems have been allocated to consecutive broadcast programs;

FIG. 7 is a simplified diagram of the state when different recording systems have been allocated, premised on post-conversion processing, in accordance with a second embodiment;

FIG. 9 is a simplified diagram of the state when different recording systems have been allocated, premised on post-conversion processing, in accordance with a third embodiment.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

Figure 1:
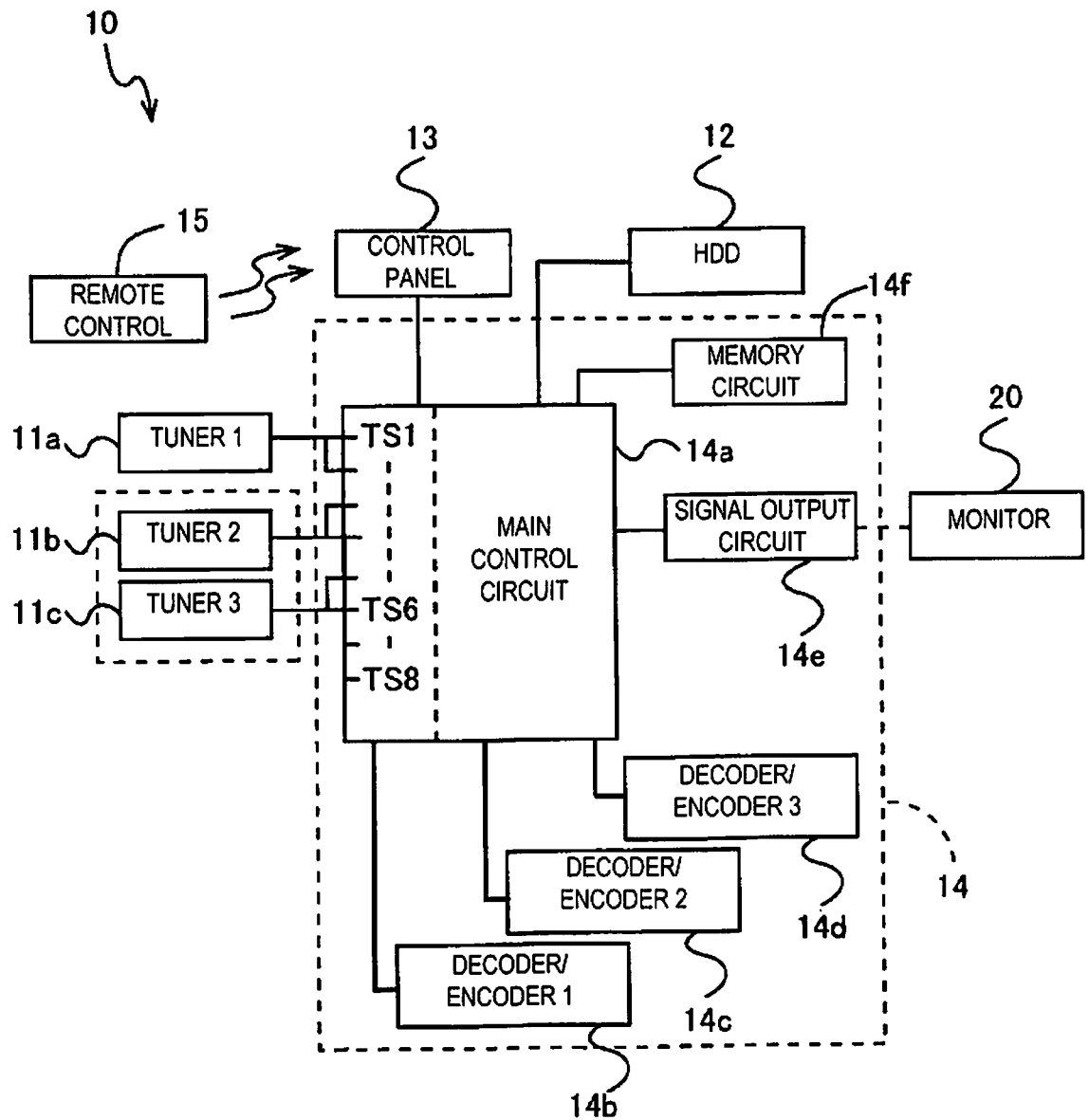
FIG. 1 is a block diagram illustrating a recording device in accordance with a first embodiment.

FIG. 1 is a block diagram of a hard disk recorder 10 (e.g., a recording device) to which the recording device and the recording method of the present disclosure are applied.

This hard disk recorder 10 comprises at least one (three in FIG. 1) tuners 11a to 11c (tuner 1 11a, tuner 2 11b, and tuner 3 11c), and a controller 14. Also, the hard disk recorder 10 comprises a hard disk drive 12 (e.g., a memory) and a control panel 13. The tuners 11a to 11c receive ground waves, satellite broadcast waves, or other such television broadcasts, radio broadcasts, and data broadcasts (e.g., broadcast programs). In the illustrated embodiment, three tuners 11a to 11c are provided, but the present invention is not limited to this configuration. The hard disc recorder 10 can include less than three or more than three tuners as needed and/or desired. The hard disk drive 12 records and reproduces digital data according to the broadcast content. The control panel 13 is provided for the user to make inputs. The controller 14 controls these components and outputs video and audio to an external monitor 20. The controller 14 comprises a main control circuit 14a, a plurality of (three in FIG. 1) decoders/encoders 14b to 14d (decoder/encoder 1 14b, decoder/encoder 2 14c, decoder/encoder 3 14c), a signal output circuit 14e, and a memory circuit 14f. The decoders/encoders 14b to 14d are used in recording and reproducing digital data with the hard disk drive 12. The signal output circuit 14e is used to output video and audio based on data, and so forth. The memory circuit 14f is used for storing various kinds of settings. In addition, a network interface for connecting to a network, a Blu-ray disc drive, or the like can be provided in a conventional manner as needed and/or desired.

The various functions of the controller 14 can be realized by independent circuit configurations. Specifically, each components (e.g., the main control circuit 14a, the decoders/encoders 14b to 14d, the signal output circuit 14e, and the memory circuit 14f) of the controller 14 can be usually realized by providing dedicated integrated circuits (e.g., LSI) corresponding to the various functions. Also, the main control circuit 14 (e.g., controller) includes a microcomputer or processor, such as a CPU (central processing unit), and can control these integrated circuits of the controller 14 with this CPU. Also, the controller 14 can also include other conventional components such as an input interface circuit, an output interface circuit, and storage devices such as a ROM (Read Only Memory) device and a RAM (Random Access Memory) device. The storage devices stores processing results and control programs. Specifically, the RAM of the controller 14 stores statuses of operational flags and various control data. The ROM of the controller 14 stores the programs for various operations. It will be apparent to those skilled in the art from this disclosure that the precise structure and algorithms can be any combination of hardware and software that will carry out the functions of the present invention. Therefore, with the controller 14, a CPU and a ROM, RAM, etc., for the programs thereof are provided, and the various functions are realized by hardware and software. In addition, a remote control 15 is provided to convey the user's commands.

As shown in FIG. 1, the main control circuit 14a are provided with a plurality of (eight in FIG. 1) input paths TS1 to TS8 as input-use transport stream lines. In the illustrated embodiment, three pairs of the input paths TS1 to TS8 are allocated for input from the three tuners 11a to 11c, respectively. More specifically, the digital output signal (e.g., the output) from the tuner 11a is inputted to the transport stream lines TS1 and TS2, the digital output signal (e.g., the output) from the tuner 11b is inputted to the transport stream lines TS3 and TS4, and the digital output signal (e.g., the output) from the tuner 11c is inputted to the transport stream lines TS5 and TS6. The main control circuit 14a internally connects the decoders/encoders 14b to 14d to the various input-use transport stream lines (e.g., TS1 to TS8), thereby decoding digital data or encoding analog data. The main control circuit 14a records decoded digital data to the hard disk drive 12 either directly as it is or after encoding it to another recording format. The main control circuit 14a reads the digital data stored in the hard disk drive 12. The main control circuit 14a decodes the digital data into analog data. The main control circuit 14a outputs a video signal, audio signal, and data signal via the signal output circuit 14e to the monitor 20 for reproduction or playback. The main control circuit 14a also decodes the inputted digital data with the decoders/encoders 14b to 14d, without recording it first, and output a video signal, audio signal, and data signal to the monitor 20. The processing to descramble transport streams of a digital broadcast can be performed inside the main control circuit 14a. However, an external descrambler can instead be provided. The main control circuit 14a can internally include components required to execute the programs in the CPU, the ROM, the RAM, etc., and executes predetermined programs.

With these configurations, the tuners 11a to 11c form tuners of the present disclosure that receive broadcast programs (hereinafter referred to simply as programs). Also, the transport stream lines TS1 to TS8, the decoders/encoders 14b to 14d, and the lines to the hard disk drive 12 form a plurality of recording systems (recording processors or recording paths) of the present disclosure that records the programs. In other words, the recording systems (or recording paths) are defined between the tuners 11a to 11c and the hard disk drive 12. In particular, in the illustrated embodiment, the tuners 11a to 11c are connected to the transport stream lines TS1 to TS6, respectively. The signal (e.g., broadcast program) from the transport stream lines TS1 to TS6 are descrambled by the main control circuit 14a, and are recorded to the hard disk drive 12, either directly as they are or after being re-encoded to different recording mode by the decoders/encoders 14b to 14d. Thus, in the illustrated embodiment, the recording systems are formed by connections or allocations of the decoders/encoders 14b to 14d relative to the transport stream lines TS1 to TS6. Also, in the illustrated embodiment, the hard disk drive 12 records the broadcast programs via the recording systems (or recording paths) between the tuners 11a to 11c and the hard disk drive 12. In the illustrated embodiment, the main control circuit 14a determines which of the decoders/encoders 14b to 14d are internally or externally connected to which of the transport stream lines TS1 to TS6 that are connected to the tuners 11a to 11c. As mentioned above, in this embodiment, there are three tuners 11a to 11c and three decoders/encoders 14b to 14d. However, this does not mean that only one recording system can be provided relative to one tuner. In the illustrated embodiment, one tuner can also be connected to a plurality of the decoders/encoders 14b to 14d. In other words, a plurality of recording systems can be connected to one tuner. Thus, an output of one tuner can be simultaneously inputted to different recording systems (or both of the at least two of recording paths). In other words, the same or single output of one tuner can be simultaneously inputted to different recording systems (or both of the at least two of recording paths). Also, the same output of one tuner can be always inputted to different recording systems. Alternatively, the same output of one tune can be inputted to different recording systems simultaneously only for a predetermined period (such as 2 minutes, or 5 minutes) before and after a partition point between consecutive broadcast programs. However, in the illustrated embodiment, the tuners 11a to 11c and the decoders/encoders 14b to 14d correspond to one another by default. Naturally, the recording systems can be changed as needed and/or desired. Specifically, the recording systems can be changed by changing connections or allocations of the decoders/encoders 14b to 14d relative to the transport stream lines TS1 to TS6 (or TS1 to TS8 when TS7 and TS8 are also connected to tuners).

FIG. 2 is a diagram showing a screen shot of a recording list. A recording list is an information source with which the main control circuit 14a performs recording, and is stored in the memory circuit 14f or the hard disk drive 12. In this example, the recording list can hold up to a maximum of 60 scheduled recordings (or 60 scheduled recording content) (e.g., predetermined range). In other words, with the hard disk recorder 10, the maximum number of the scheduled recording (e.g., predetermined range) is 60. Of course, this number can be different as needed and/or desired. A single scheduled recording comprises a broadcast wave channel number L1 that is received by the tuners 11a to 11c, a program title (or ID) L2 that is to be recorded, a start date L3, a start time L4, an end time L5, a recording system L6, a designated mode L7 (e.g., a recording mode), an actual mode L8 (e.g., a recording mode), and conversion necessity L9. The channel number L1, the program title (or ID) L2, the start date L3, the start time L4, and the end time L5 are what their names indicate. The recording system L6 indicates via which of the three decoders/encoders 14b to 14d the recording will be performed. In the illustrated embodiment, the decoder/encoder 14b is used in the recording system 1, the decoder/encoder 14c is used in the recording system 2, and the decoder/encoder 14d is used in the recording system 3, for example. The designated mode L7 shows whether the setting of a scheduled recording will be in DR mode (e.g., direct recording mode) or AVC (Advanced Video Coding) mode (e.g., compressed recording mode). Of course, these recording mode of the schedule recording can include different recording mode from described above. The actual mode L8 shows the recording mode (DR mode or AVC mode) when a broadcast is received and recorded, regardless of the setting of a scheduled recording. As will be discussed below, this is because there are cases when recording is performed in DR mode, in which the load is low during recording, and is converted later to the designated recording mode. The conversion necessity L9 shows whether or not this conversion is necessary. This will be described in detail below.

Figure 3:
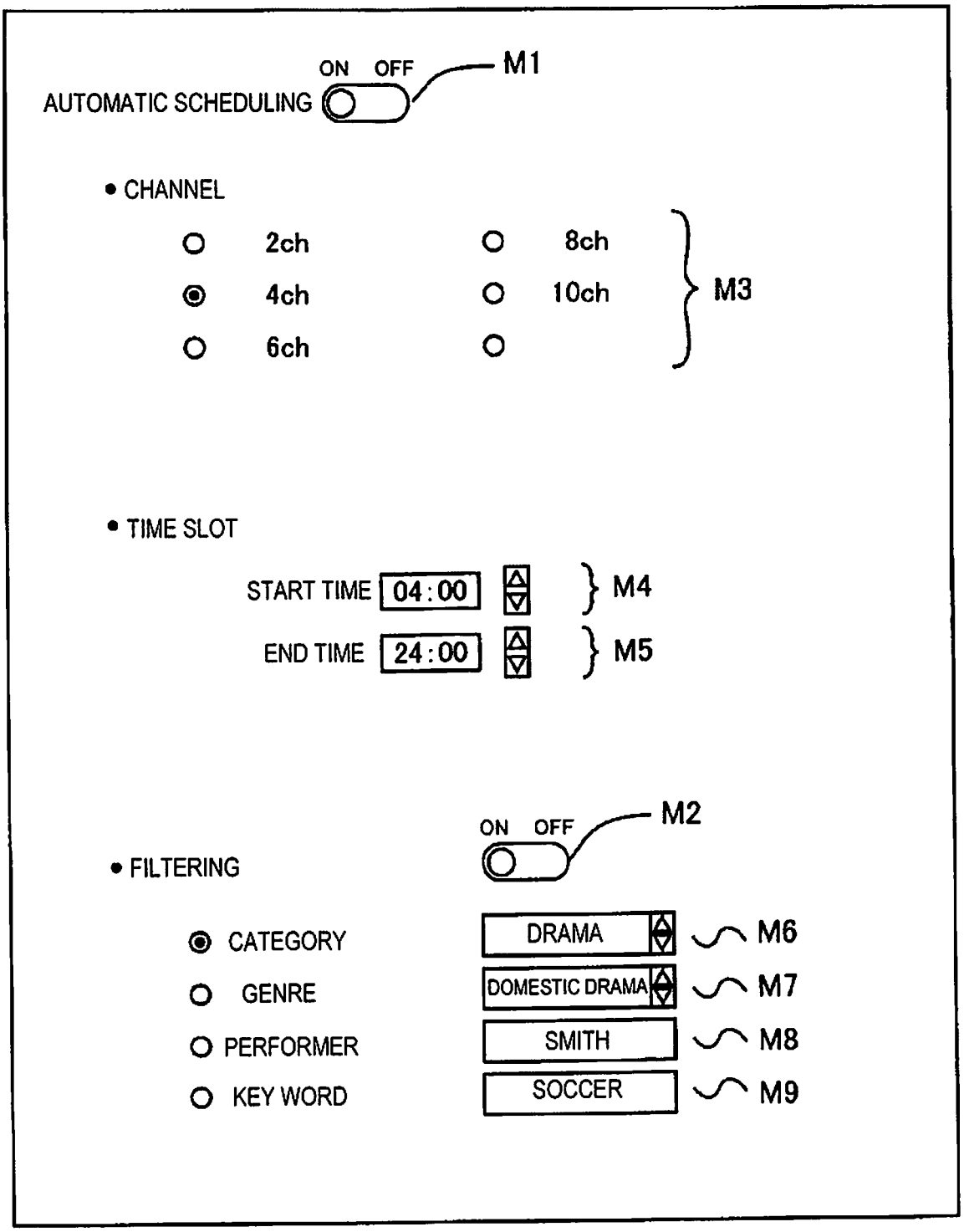
FIG. 3 is a diagram showing a screen shot of automatic scheduling used in the recording device illustrated in FIG. 1.

FIG. 3 is a diagram showing a screen shot of automatic scheduling (i.e., scheduled recording). This screen is a setting screen with which all of the programs broadcast in a predetermined time slot on a predetermined channel can be recorded, which is called time shift recording or loop recording, and can then be viewed later at any time. Although the phrase "all of the programs" is used above, there is a limit to recording capacity or a registration limit of scheduled recording. Thus, basically older programs are deleted in a first-in, first-out arrangement, within the limits of the recording capacity or the registration limit.

At the uppermost part of this display screen are displayed the heading "Automatic scheduling" and, to the right thereof, a switch M1 that can be switched "on" or "off." Below this are displayed three main categories: "Channel," "Time slot," and "Filtering." "Channel" and "Time slot" are essential setting categories, but a switch M2 that can be switched on or off is displayed to the right of the "Filtering" category, and is an optional setting category.

When the switch M1 is set to "on" in order to perform the automatic scheduling, a channel is selected as an essential setting category. A selected channel group M3, which comprises radio buttons that are selected or not and which displays as labels all of the channels that can currently be received, is displayed on the screen. The user puts check marks on the radio button in front of the channel on which the time shift recording is to be performed, out of this selected channel group M3. In the time shift recording, the hard disk drive 12 needs to have a large-capacity storage region. This storage region is proportional to the number of selected channels. Therefore, the user can select a radio button so as to narrow down the channels.

Since the time shift recording involves consecutively recording over an approximately designated time slot, the storage region used in the hard disk drive 12 is also approximately proportional to the length of the time slot. Therefore, an input box M4 for setting the start time and an input box M5 for setting the end time are provided so that the user can narrow down the time slot.

When the automatic scheduling is performed, if the automatic scheduling function has been set to "on" with the switch M1, then the user selects the channel in the selected channel group M3, sets the start time with the input box M4, and sets the end time with the input box M5.

Conventionally, the broadcast programs on the selected channel are consecutively recorded from the start time until the end time on the hard disk drive 12 based on the above information alone. On the other hand, with the present disclosure, as will be discussed below, all of the programs on the selected channel in the predetermined time slot are put on the recording list shown in FIG. 2, and scheduled recording is performed based on the recording list. With the configuration of the present disclosure, individual programs are scheduled to be record, and a plurality of consecutive programs on a single channel (e.g., a predetermined channel) are recorded from the start time until the end time with different recording systems (or at least two of recording paths). Thus, the recorded programs are not cut off at the start or end.

Figure 4:
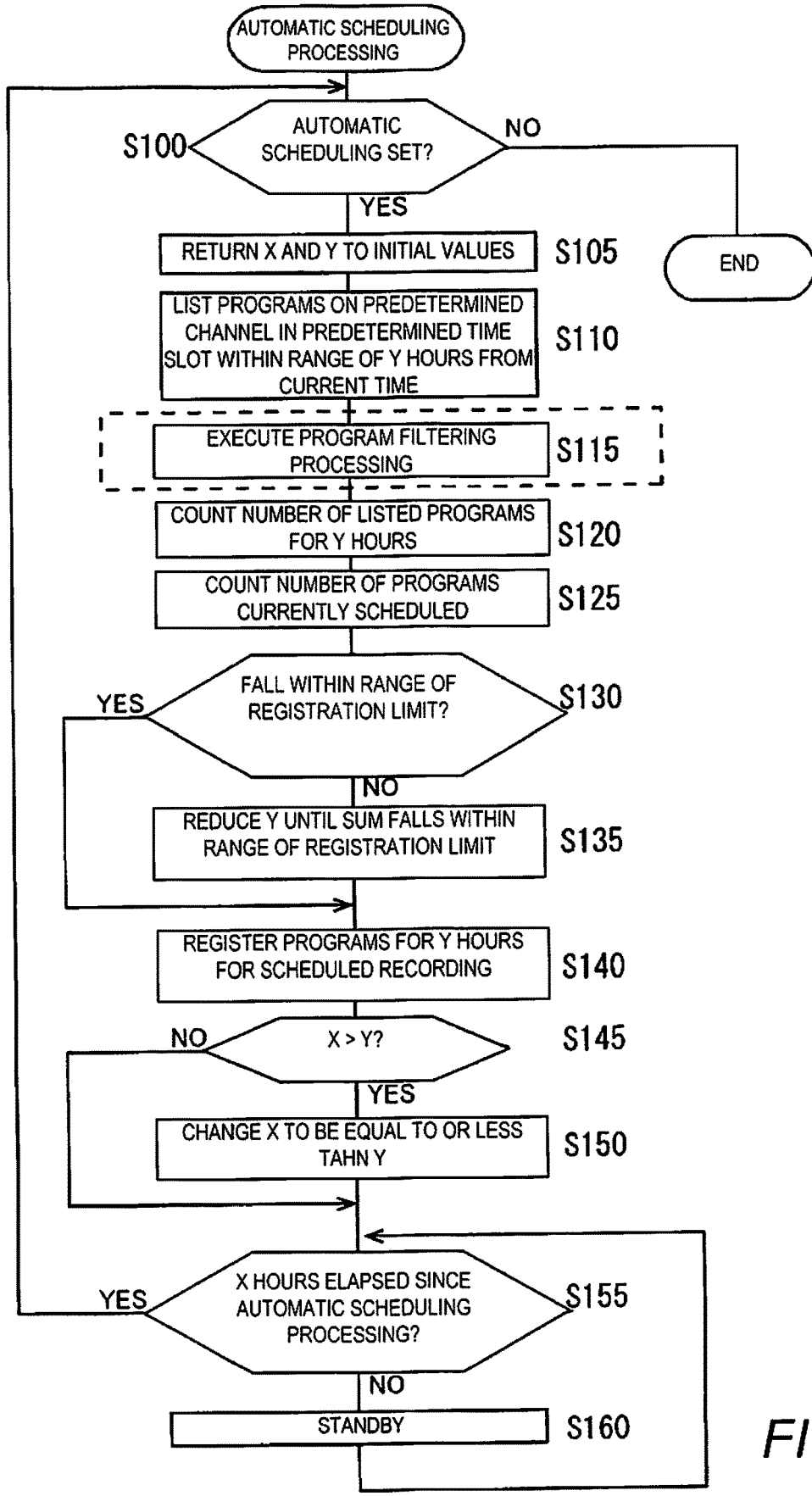
FIG. 4 is a flowchart of automatic scheduling processing.

FIG. 4 is a flowchart of automatic scheduling processing. In automatic scheduling processing, in step S100 the main control circuit 14a determines whether automatic scheduling has been set. Whether or not automatic scheduling has been set is determined by reading what has been set with the switch M1 shown in FIG. 3.

Next, in step S105, the main control circuit 14a returns X and Y to their initial values. X here is a parameter indicating the time interval (e.g., the predetermined time interval), in hours, at which this automatic scheduling processing is to be repeated. Y is a parameter indicating how many hours of programs to be scheduled (e.g., the predetermined time period) when automatic scheduling has begun. Here, X and Y are both initially set to 6 hours, for example.

In step S110, the programs on the predetermined channel in the predetermined time slot are confirmed, within the range of Y hours from the current time. As a premise to this processing, the main control circuit 14a acquires a program list (e.g., program list information) for the predetermined channel. The program list is included in the transport packet of broadcast data for each channel. Data for the program list is stored at the point of descrambling, and is reconfigured as a series of program list data. This processing is always carried out in parallel with the automatic scheduling processing.

The predetermined time slot is the period between the start and end times set with the input boxes M4 and M5. Usually, this is set so that the start time is 04:00 and the end time is 23:30. However, it is also possible for the end time to go past 24:00. For instance, if it is 02:00, the predetermined time slot should be determined by adding 24 hours, which gives 26:00. Specifically, if the start time is 04:00 and the end time is 02:00, the start time is left as 04:00, but the end time is given as 26:00.

At this point, all of the programs on the predetermined channel in the predetermined time slot within a range of Y hours after the current time are listed.

Then, the process proceeds to step S120. Step S115 will not be described here because it is not executed in the process of the first embodiment.

The main control circuit 14a in step S120 counts the number of the programs for Y hours (e.g., the predetermined time period) that have been listed in step S110, and in step S125 counts the number of the programs that are currently scheduled. Then, in step S130, it is determined whether the sum of the number of the programs for Y hours that have been listed and the number of the programs that are currently scheduled falls within the range of the registration limit of scheduled recordings (e.g., the predetermined range) for the hard disk recorder 10. In the illustrated embodiment, any overlaps between the programs that are currently scheduled and the programs for Y hours that have been listed are deleted in advance before calculating the sum.

If the sum exceeds the range of the registration limit of scheduled recordings, not all of the programs for Y hours that have been listed can be registered. Therefore, if the sum does not fall within the range of the registration limit of scheduled recordings, then in step S135 Y is reduced to decrease the number of the programs for Y hours that are listed such that the sum falls within the range of the registration limit of scheduled recordings.

More specifically, 1 (hour) is subtracted from Y in step S135, and in step S135 processing in steps S110 to S130 are repeated. Sometimes subtracting of just 1 (hour) is enough, but other times 2 or 3 (hours) have to be subtracted. In this case, the processing in steps S110 to S130 are repeated twice or three times (1 hour subtraction at a time), for example.

Once the sum falls within the range of the registration limit of scheduled recordings, the main control circuit 14a in step S140 registers all of the programs for Y hours for scheduled recordings. Specifically, at this point, the recording systems L6 corresponding to the initial values for the tuners 11a to 11c, and the designated mode L7 for designating DR mode as the default designated mode are registered, in addition to the channel number L1, the program title L2, the start date L3, the start time L4, and the end time L5 obtained from the program list. The actual mode L8 and the conversion necessity L9 are left blank in the recording list. The number of the tuners 11a to 11c corresponds to the number of channels that can be time-shift recorded at the same time.

In step S145, it is determined whether "X>Y," and if the determination result is positive, then X is changed to Y or less in step S150. In other words, the main control circuit 14a sets X (e.g., predetermined time interval) to be less than or equal to Y (e.g., predetermined time period). The purpose of this is to avoid a situation in which there is a time slot that is not automatically scheduled when automatic scheduling processing is again started after X hours (greater than Y hours) after the programs for Y hours have been added to the recording list.

After X has thus been adjusted, in step S155 it is determined whether X hours have elapsed since the above-mentioned automatic scheduling processing. If the result is negative, then in step S160 the processing stands by. Once X hours have elapsed, the processing from step S100 onward is once again executed.

Thus, in this embodiment, the recording list for recording the programs on a plurality of channels is produced based on program list (e.g., program list information) for these channels at X hours interval (e.g., at a predetermined time intervals).

This makes it possible to schedule the recording of all of the programs for the future Y hours every X hours. Even if there are too many programs for Y hours to exceed the range of the registration limit of scheduled recording, the value of Y (e.g., length of the predetermined time period) can be adjusted so as not to exceed the range of the registration limit upon registering the automatic scheduling. Thus, no scheduling is missed. For example, if the registration limit of scheduled recordings is 60, the number of the programs that are currently scheduled is 30, and the number of the programs for Y hours that have been listed is 40, then the sum of the number of the programs that are currently scheduled and the number of the programs for Y hours exceeds the range of the registration limit of 60. However, with the present disclosure, the value of Y is reduced until the number of the programs for Y hours that are listed is less than 30. Thus, the maximum number of programs within the range of the registration limit of 60 can be scheduled for recording. Furthermore, with the present disclosure, the next automatic scheduling processing will be executed in X hours which are within a range that does not exceed Y hours. Thus, no programs will be left out in the next automatic scheduling processing.

Thus, in this embodiment, by adjusting the value of Y, the time interval for producing or updating the recording list can also be set according to the number of the programs for Y hours (e.g., the predetermined time period) based on the program list (e.g., program list information) for a plurality of channels.

The above processing method forms a recording method of the present disclosure. Specifically, with the recording method, the recording list (e.g., automatic recording list) is produced. In particular, the processing in step S110 (and S115) corresponds to a step of listing the programs for a predetermined channel in a predetermined time slot within a predetermined time period after the current time. The processing in step S125 corresponds to a step of counting the number of the programs that are currently scheduled. The processing in step S130 corresponds to a step of reducing the predetermined time period for the sum of the number of the programs that have been listed and the number of the programs that are currently scheduled to fall within the range of the registration limit of scheduled recordings (e.g., within the predetermined range) when the sum exceeds the range of the registration limit of scheduled recordings. In particular, the processing in step S130 corresponds to a step of reducing the predetermined time period until the sum of the number of the programs that are listed and the number of the programs that are currently scheduled (i.e., the number of the programs to be registered for scheduled recordings) falls within the range of the registration limit of scheduled recordings when the sum exceeds the range of the registration limit of scheduled recordings. The processing in steps S135 and S140 corresponds to a step of adding the programs that have been listed to the recording list as scheduled programs in addition to the programs that are currently scheduled within the range of the registration limit of scheduled recordings. The processing in steps S145 to S160 corresponds to a step of waiting for a time period (X hours) within the above-mentioned range of the predetermined time period (Y hours) to elapse, and a step of repeating automatic scheduling. Also, the processing in steps S155 and S105 corresponds to a step of returning the predetermined time period (X hours) to the initial value after the predetermined time period (X hours) has elapsed.

Figure 5:
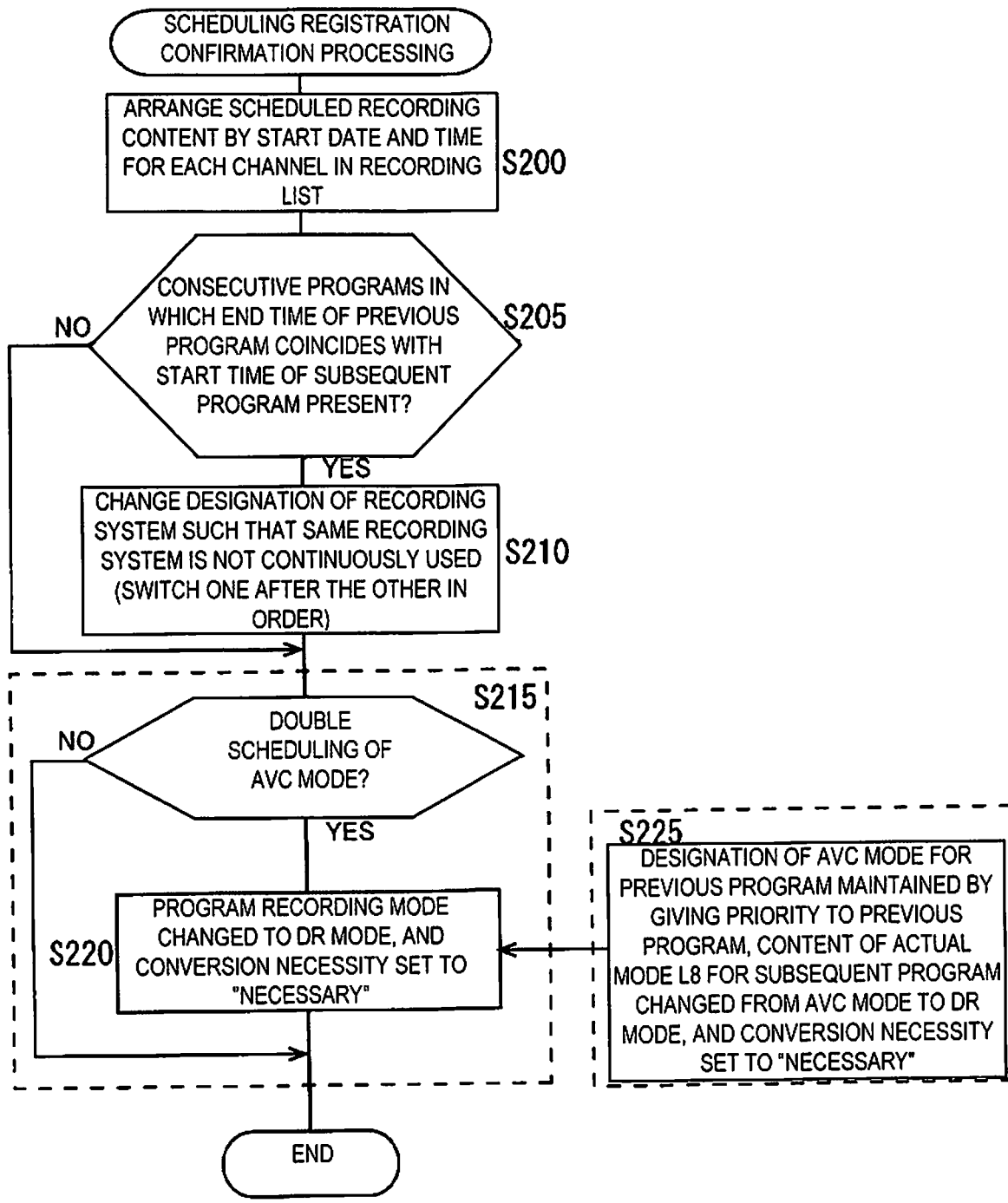
FIG. 5 is a flowchart of scheduling registration confirmation processing.

Next, FIG. 5 is a flowchart of scheduling registration confirmation processing.

In the illustrated embodiment, there are three tuners 11*a* to 11*c*, and thus the time shift recordings or loop recordings on three channels are possible at the maximum. However, in actual practice, the setting of the time shift recording can be different from this setting, and the number of the channels for the time shift recording is reduced such that scheduled recording for programs can be executed individually. For example, in the illustrated embodiment, the time shift recording is set for one channel received with the tuner 11*a*.

The scheduling registration confirmation processing shown in FIG. 5 prevents the recorded programs from being cut off at the start or end when the programs are scheduled to record automatically.

The main control circuit 14*a* in step S200 arranges the scheduled recording content by the start date and time for each channel in the recording list. Then, the main control circuit 14 in step S205 determines whether or not there are consecutive programs (back-to-back programs) in which the end time of a previous program and the start time of a subsequent program coincide with each other. Of course, the end time of the previous program and the start time of the subsequent program coincide in the case of automatic scheduling. However, even without automatic scheduling, for example, this scheduling registration confirmation processing is still performed because performing scheduling registration confirmation processing prevents the recorded programs from being cut off at the start or end.

If there are consecutive programs, then the main control circuit 14*a* in step S210 changes the designations of the recording systems so that one recording system will not be continuously used for recording the consecutive programs. For example, the recording systems are switched one after the other, in order.

FIG. 6 is a simplified diagram of the state when recording systems have been allocated.

As shown in FIG. 6, programs A to C are consecutive programs on the same channel received by the tuner 11*a* between 7:00 am and 10:00 am. When the automatic scheduling processing shown in FIG. 4 is performed, the decoder/encoder 14*b* of the recording system that is allocated by default to the tuner 11*a* is allocated to the programs A to C. The decoder/encoder 14*b* performs predetermined processing at the end of the recording. Thus, if the processing by the decoder/encoder 14*b* at the end of the recording is commenced after the recording is ended at the original end time, then the recording of the next program by the decoder/encoder 14*b* cannot be commenced at the start time of the next program. In this case, the first part of the next program is cut off, for example. To avoid this, the processing at the end of the recording can be commenced before the original end time of the previous program. However, in this case, the end part of the previous program is cut off.

On the other hand, in the illustrated embodiment, when there are consecutive programs in which the end time of the previous program (e.g., first program) coincides with the start time of the subsequent program (e.g., second program), the main control circuit 14 in step S210 changes the designation of the recording system so that the same recording system is not continuously used for recording the consecutive programs. With this configuration, even if the recording is executed using one recording system until the end time of the previous program, and the processing at the end of the recording is commenced using this recording system from the end time, it is possible to commence the recording with another recording system from the start time of the subsequent program. Thus, neither the end nor the start of the programs is cut off.

More specifically, in the illustrated embodiment, as mentioned above, the recording system 1 is allocated to the program A, the program B, and the program C by default after the automatic scheduling processing shown in FIG. 4. However, when the scheduling registration confirmation processing shown in FIG. 6 is executed, the recording system allocated to the program B is changed to the recording system 2 while the recording system 1 is still allocated to the program A and the program C such that the recording system 1 is prevented from being continuously used. In particular, if the programs are consecutive, then two recording systems are switched from one to the other. With the recording list in FIG. 2, the allocated recording system is set to the recording system L6. In the illustrated example as shown in FIG. 6, the recording list is updated such that the entry under the recording system L6 for the program B is changed to the recording system 2.

Once the recording list is thus set, the main control circuit 14*a* executes scheduled recording by using the allocated recording system when the current time coincides with the start date and start time of the program in this recording list. This processing corresponds to recording the programs with a recording component (recording system) based on the recording list, and constitutes a controller. In the illustrated embodiment, the main control circuit 14*a* deletes from the recording list the content of the programs after completion of recording of the programs.

For example, the main control circuit 14*a* receives the predetermined channel with the tuner 11*a* based on the scheduled recording content in the recording list. The TS that is outputted from the tuner 11*a* is inputted via the transport stream line TS1 and the transport stream line TS2. Specifically, the first program A is inputted to the decoder/encoder 14*b* using the transport stream line TS1, and the converted digital data is recorded to the hard disk drive 12

(i.e., scheduled recording using the recording system 1). The recording system is changed to the recording system 2 for the next program B. The main control circuit 14a causes the tuner 11a to receive on the same channel, the output is inputted to the decoder/encoder 14c using the transport stream line TS2, and the converted digital data is recorded to the hard disk drive 12 (i.e., scheduled recording using the recording system 2). As a result, a plurality of different recording systems (or at least two of recording paths) are allocated in the recording of the consecutive programs that are consecutive on a single channel. Thus, in the illustrated embodiment, the main control circuit 14a (e.g., the controller) uses different recording systems 1 and 2 to record the first program A and the second program B when the end time of the first program A coincides with the start time of the second program B on the predetermined channel. Also, in the illustrated embodiment, the main control circuit 14a (e.g., the controller) records the consecutive programs A and B with the different recording systems 1 and 2 based on the recording list in which the different recording systems 1 and 2 are allocated for the consecutive programs A and B on the predetermined channel. Also, in the illustrated embodiment, the main control circuit 14a (e.g., the controller) acquire the program list (e.g., the program list information) for the predetermined channel, and records the consecutive programs A and B on the predetermined channel based on the recording list in which the consecutive programs A and B are allocated to the different recording systems 1 and 2 based on the program list for the predetermined channel.

As discussed above, in step S200, the scheduled recording content at the start date and time for each channel in the recording list is arranged. Then, in step S205 it is determined whether or not there are consecutive programs (back-to-back programs) in which the end time of the previous program and the start time of the subsequent program coincide with each other. Since information about the start time and the end time of the programs is acquired for each channel in this processing, this processing corresponds to an acquisition component. Information about the start time and the end time of the programs for each channel can be acquired by various methods, and the processing in steps S200 and S205 is not the only option.

Next, in step S205, if it is determined that there are consecutive programs in which the end time of the previous program coincides with the start time of the subsequent program, then in step S210 the designation of the recording system is changed so that the same recording system is not continuously used. In this processing, the recording list is produced for allocating a plurality of different recording systems for the recording of the consecutive programs that are consecutive on a single channel. Thus, this processing corresponds to a recording list production component. A variety of methods can be employed for reflecting this in the recording list, and the procedure given in steps S205 and S210 is not the only option. Thus, in the illustrated embodiment, when the end time of the first program A coincides with the start time of the second program B on the predetermined channel, the main control circuit 14a produces the recording list in which the first program A and this second program B are allocated to the different recording systems 1 and 2. Also, the processing in step S210 corresponds to a step of producing the recording list in which the consecutive programs A and B on the predetermined channel are allocated to the different recording systems 1 and 2.

In the illustrated embodiment, in order to allocate the different recording systems to the consecutive programs that are consecutive on a single channel, the recording list for recording different programs that are consecutive on the same channel by using different recording systems is produced based on the program list (e.g., program list information) for the channel. The programs are then recorded based on the recording list. Thus, a step of acquiring the start times and the end times of the individual programs that are consecutive and are to be recorded on the predetermined channel, and a step of producing the recording list for recording the programs using different recording systems based on the start times and end times of the individual programs that are consecutive are executed here.

In this embodiment, the programs are individually scheduled for recording by automatic scheduled recording. Thus, titles are divided up by program after recording the programs. This is an advantageous effect of the recording device and the recording method in accordance with the first embodiment with respect to the conventional continual recording (loop recording).

Also, switching between the different recording systems prevents the start or end of the recorded programs from being cut off.

Furthermore, automatically adjusting the time of the automatic scheduling processing also prevents the recoding from being bound to the registration limit of scheduled recording.

Accordingly, with the recording device, continual recording (loop recording) can be performed in which the programs are divided up by title, and is not bound to the registration limit of scheduled recording. Thus, the recorded programs are not cut off abruptly at the start or the end. Specifically, the programs are individually scheduled for recording by automatic recording scheduling involving the automatic scheduling processing. Thus, in the recorded state, the programs are divided up by title. Also, the recording systems (recording processors) are switched by the scheduling registration confirmation processing. Thus, the recorded programs are not cut off at the start or the end. Furthermore, the duration of the automatic scheduling processing is automatically adjusted until the number of the programs falls within the range of the registration limit of scheduled recording. Thus, the recording of the programs is not bound by the registration limit.

Second Embodiment

Figure 8:
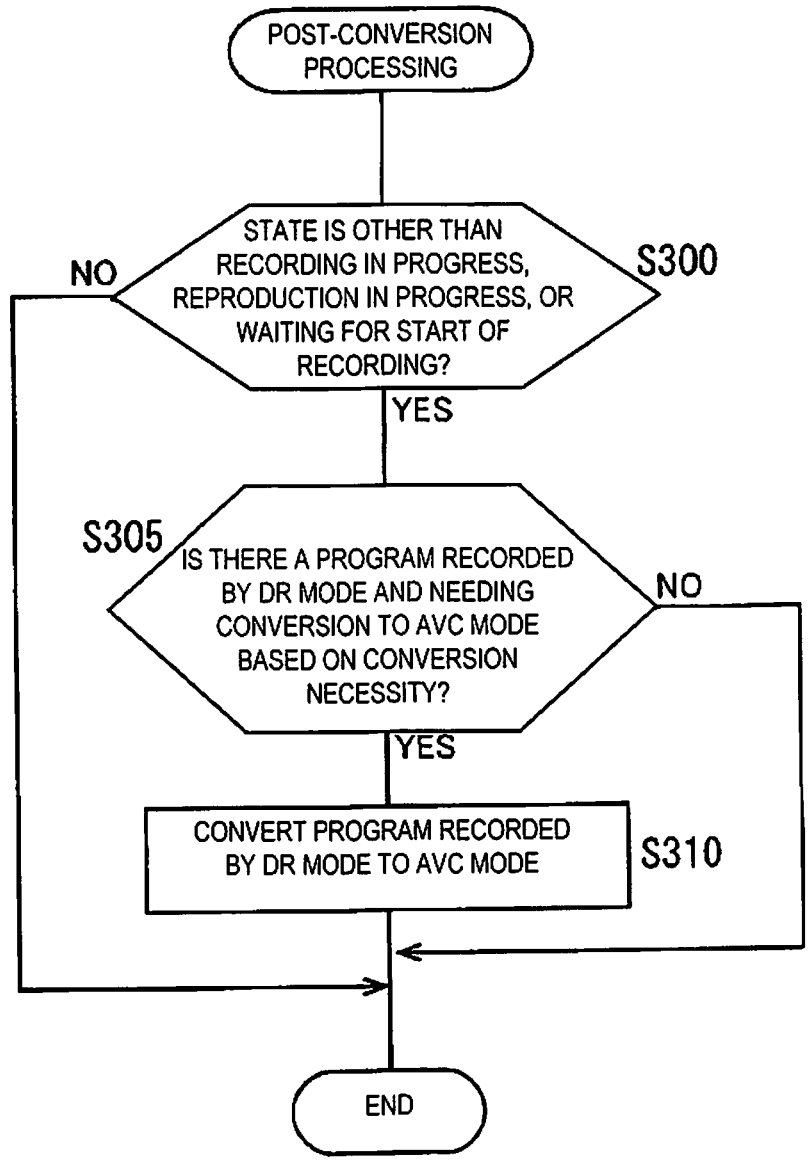
FIG. 8 is a flowchart of the post-conversion processing.

Referring now to FIGS. 5, 7 and 8, a hard disk recorder 10 (FIG. 1) in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

As mentioned above, DR mode, AVC mode, or the like can be selected as the recording mode. DR mode is a direct recording mode. DR mode basically includes all of the data that has been broadcast. However, all of the data does not necessarily have to be included in DR mode. Thus, in the illustrated embodiment, it is still called DR mode when some of the data is intentionally left out.

On the other hand, AVC mode basically include data that has been subjected to processing to reduce the amount of data by changing the video compression mode, for example. In other words, to record the programs in AVC mode while the programs are being broadcasted, two or more of the decoders/encoders 14b to 14d are required to process the data of the programs.

When the automatic scheduling is not performed, the user can manually schedule the recordings individually using the program list. In this case, the user can designate AVC mode, rather than DR mode, as the recording mode. In this case, the designated mode (AVC mode) is stored in the recording list shown in FIG. 2 as the category for the designated mode L7.

When the recording mode is designated, the processing of steps S215 and S220 is executed, which is not executed in the first embodiment in the flowchart shown in FIG. 5. A state in which the designated modes for the consecutive programs are both AVC mode is called double scheduling of AVC mode.

As shown in FIG. 5, in steps S200 to S210, it is determined whether or not there are consecutive programs (back-to-back programs) in which the end time of the previous program and the start time of the subsequent program coincide with each other. Also, in step S215 it is determined whether or not a state of the double scheduling of AVC mode has occurred, in which the designated mode is AVC mode for both the previous and the subsequent programs.

As mentioned above, the hard disk recorder 10 (FIG. 1) includes three decoders/encoders 14b to 14d. However, there is a case in which it is impossible to use two of the decoders/encoders 14b to 14d for both the previous and the subsequent programs. For example, when time shift recordings on two channels have been set, and one of the decoders/encoders 14b to 14d are allocated for playback the recorded programs, only one of the decoders/encoders 14b to 14d is available for the time shift recording on each channel. In this case, the double scheduling of AVC mode for the consecutive programs on the same channel cannot be performed.

Accordingly, if it is determined that a state of the double scheduling of AVC mode occurs, then in step S220 the actual modes L8 for recording the consecutive programs are changed from AVC mode to DR mode. Also, the conversion necessities L9 for the consecutive programs are set to "necessary." If the recording mode is designated, then during recording the main control circuit 14a refers not only to the designated mode L7, but also to the actual mode L8, and executes processing corresponding to the recording mode determined by giving priority to the actual mode L8. Of course, since the intent of the user is not reflected with this recording, the post-conversion processing described later will be executed.

FIG. 7 is a simplified diagram of the state when the recording systems have been allocated, premised on the post-conversion processing. In this embodiment, the designated modes for the recording of the programs A to C are AVC mode under the same conditions as in the example shown in FIG. 6. However, the main control circuit 14a refers to the designated mode L7 (AVC mode), and changes the actual mode L8 to DR mode as shown in FIG. 7. Also, the main control circuit 14 changes the recording system for recording the program B to the recording system 2 in the same manner as mentioned above. Consequently, consecutive recoding using the same recording system and consecutive recording in AVC mode can be avoided.

FIG. 8 is a flowchart of the post-conversion processing.

In the illustrated embodiment, the recordings of the programs are executed in DR mode during broadcast even though the user has specified AVC mode as the recording mode for the programs. On the other hand, the intent of the user will be reflected by executing this post-conversion processing.

In this post-conversion processing, the main control circuit 14a in step S300 determines whether or not the state is one of recording in progress, reproduction in progress, or waiting for the start of recording. This is because if one of these states exists, there can be situations in which the input of the user cannot be reflected by executing the post-conversion processing. Therefore, the conversion processing is to be executed at some point when none of this processing is in progress.

If the state is other than the state of recording in progress, reproduction in progress, or waiting for the start of recording, then in step S305 the content of the conversion necessity L9 in the recording list is checked, and it is determined whether or not there is a program that has been recorded by DR mode and need to convert to AVC mode. Conversion is needed when the content of the conversion necessity L9 indicates "necessary." If there is a program for which the content of the conversion necessity L9 is "necessary," then in step S310 the program recorded by DR mode is converted to AVC mode. Basically, the content for the program in the recording list is deleted upon completion of recording of the program. However, with the programs for which the content of the conversion necessity L9 is "necessary," the content for the programs in the recording list is deleted after conversion.

Thus, in the illustrated embodiment, the main control circuit 14a records at least one of the consecutive programs (the programs A to C in FIG. 7) while changing the predetermined recording mode (AVC mode). Also, in the illustrated embodiment, the main control circuit 14a executes the post-conversion processing to the at least one of the consecutive programs (the programs A to C in FIG. 7). In the illustrated embodiment, the recording list includes the designated mode L7 or the actual mode L8 (e.g., information about the recording mode) and the conversion necessity L9 (e.g., information about whether or not to change the recording mode upon completion of recording).

Third Embodiment

Referring now to FIGS. 5 and 9, a hard disk recorder 10 (FIG. 1) in accordance with a third embodiment will now be explained. In view of the similarity between the first to third embodiments, the parts of the third embodiment that are identical to the parts of the first and second embodiments will be given the same reference numerals as the parts of the first and second embodiments. Moreover, the descriptions of the parts of the third embodiment that are identical to the parts of the first and second embodiments may be omitted for the sake of brevity.

In the second embodiment as mentioned above, if there is double scheduling of AVC mode, then DR mode is used for all scheduled recordings. On the other hand, in the third embodiment, a modification example of the processing is provided for more efficient recording.

In the third embodiment, the processing in step S225 is performed instead of the processing in step S220 in FIG. 5. In step S225, the designation of AVC mode is unchanged for recording the previous program A by giving priority to the previous program A, and the content of the actual mode L8 for the subsequent program B is changed from AVC mode to DR mode.

FIG. 9 is a simplified diagram of the state when the recording systems have been allocated in this embodiment. In the illustrated embodiment, the designated modes for the recording of the consecutive programs A to D is AVC mode under the same conditions as in the example shown in FIG. 6. In this case, in the illustrated embodiment, the main control circuit 14a maintains the designation of AVC mode for the previous program A by giving priority to the previous program A as shown in FIG. 9. On the other hand, the main control circuit 14a refers to the designated mode L7 (AVC mode) for the subsequent program B, and changes the actual mode L8 to DR mode. Also, since the recording mode for the subsequent program B is changed to DR mode, the main control circuit 14a maintains the designation of AVC mode for the further subsequent program C as shown in FIG. 9. Furthermore, since the designation of AVC mode for the program C is maintained, the main control circuit 14a further refers to the designated mode L7 (AVC mode) for the subsequent program D, and changes the actual mode L8 to DR mode. Also, the main control circuit 14 changes the recording system for recording the programs B and D to the recording system 2 by giving priority to the programs A and C in the same manner as mentioned above. Consequently, recording in AVC mode can be executed as much as possible in a state in which recording in AVC mode is possible. With this configuration, the processing load for the post-conversion processing from DR mode to AVC mode can be reduced. This also allows the recording mode of the programs recorded to the hard disk drive 12 to be made into the designated recording mode as designated by the user as soon as possible.

Thus, in the illustrated embodiment, the main control circuit 14a record at least one of the consecutive programs (the programs B and D in FIG. 9) while changing the predetermined recording mode (AVC mode). Also, in the illustrated embodiment, when the recording modes of two consecutive programs (programs A and B, programs B and C, or programs C and D in FIG. 9) are AVC mode (e.g., compressed recording mode), the main control circuit 14a maintains the designation of AVC mode (e.g., the predetermined recording mode) for one of the two consecutive broadcast programs (program A or program C in FIG. 9), and changes the designation of AVC mode (e.g., the predetermined recording mode) of the other one of the two consecutive broadcast programs (program B or program D in FIG. 9) to DR mode (e.g., direct recording mode). Also, in the illustrated embodiment, the main control circuit 14a executes the post-conversion processing to the at least one of the consecutive programs (program B or program D in FIG. 9). Also, in the illustrated embodiment, the main control circuit 14 at least one of the consecutive programs (program A or program C in FIG. 9) without changing the predetermined recording mode (AVC mode).

Fourth Embodiment

Figure 10:
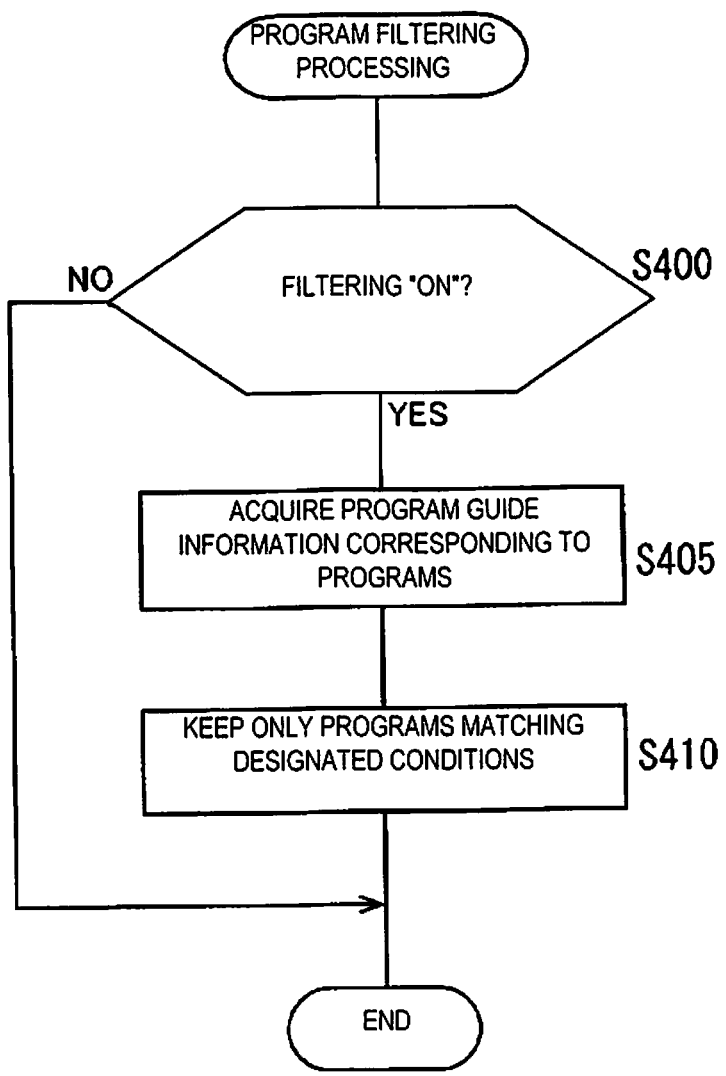
FIG. 10 is a flowchart of program filtering processing in accordance with a fourth embodiment.

Referring now to FIGS. 3, 4 and 10, a hard disk recorder 10 (FIG. 1) in accordance with a fourth embodiment will now be explained. In view of the similarity between the first to fourth embodiments, the parts of the fourth embodiment that are identical to the parts of the first to third embodiments will be given the same reference numerals as the parts of the first to third embodiments. Moreover, the descriptions of the parts of the fourth embodiment that are identical to the parts of the first to third embodiments may be omitted for the sake of brevity.

In the automatic scheduling, program filtering (or narrowing down) can be executed in addition to designations of the predetermined channel and the predetermined time slot.

In FIG. 3, input boxes M6 to M9 for program filtering are displayed in addition to the designations of the predetermined channel and the predetermined time slot as discussed above. With this configuration, the program filtering can be executed.

First, when the switch M2 to the right of "Filtering" is switched to "on," the input boxes M6 to M9 for category, genre, performer, and keyword are displayed to allow for setting. The user can select "drama" with the input box M6 as the category, and can select "Domestic drama" with the input box M7 as the genre thereof. Categories that can be selected include "sports," "movies," and so forth, and categories that can be selected under sports include genres such as "soccer," "baseball," and the like.

As performers, the user can use the input box M8 to input the desired name or nickname, and can also use the input box M9 to input keywords as desired.

When the user moves the switch M2 to the right of "Filtering" to the "off" position, the program filtering processing of step S115 in FIG. 4 is not executed, and the processing as described in the first embodiment will be executed. On the other hand, when the switch M2 is moved to the "on" position, the program filtering processing of step S115 shown in FIG. 4 is executed.

FIG. 10 is a flowchart of the program filtering processing.

In the program filtering processing, the following processing in steps S405 and S410 is executed when it is determined that "Filtering" is set to "on" in step S400.

In step S405, the program guide information corresponding to the programs that are listed in step S110 is acquired. The program guide information is information included in the program list. The main control circuit 14a determines whether or not at least one of the programs for the next Y hours that are listed in step S110 matches the conditions designated with the input boxes M6 to M9.

In step S410, only the programs matching the designated conditions are kept as listed programs. That is, as a result of determining whether or not there is a match in the processing in step S405, the programs that do match are left as listed programs for the subsequent processing after step S115 in FIG. 4, and programs with no match at all are deleted or discarded. In the illustrated embodiment, the program list includes information that describes the programs, such as the category, genre, and performers of the programs, in addition to the channel number L1, the program title L2, the start date L3, the start time L4, and the end time L5. Thus, the above-mentioned program filtering can be performed based on the information designated with the input boxes M6 to M9.

The information used for the program filtering process is not limited to the content of the input boxes M6 to M9, and the different or additional information can be utilized.

It should go without saying that the present invention is not limited to or by the above examples. It should also be obvious to a person skilled in the art that: suitably changing the combinations of mutually interchangeable members, configurations, etc., disclosed in the above examples, suitably replacing, or changing the combinations of, the mutually interchangeable members, configurations, etc., disclosed in the above examples with members, configurations, etc., that are known technology, albeit not disclosed in the above examples, and suitably replacing, or changing the combinations of, members, configurations, etc., that a person skilled in the art could imagine, based on known technology and the like, as substitutes for the mutually interchangeable members, configurations, etc., disclosed in the above examples are disclosed as examples of the present invention.

In the illustrated embodiments, the recording device includes a tuner and a plurality of recording processors. The recording device is configured such that a plurality of consecutive broadcast programs on a predetermined channel are recorded with different recording processors.

When the recording processors are provided internally, the consecutive broadcast programs on the predetermined channel are recorded with different recording processors. Thus, a previous broadcast program can be recorded from start to end with one recording processor. Also, a subsequent broadcast program can be recorded from start to end using another recording processor. Consequently, there is no period in which recording is impossible between the consecutive broadcast programs.

Also, in addition to the above-mentioned tuner, the recording device can include a recording component having the plurality of the recording processors relative to the tuner, and an acquisition component that acquires information about the start time and the end time of each of the broadcast programs for each channel. The controller records the broadcast programs with the recording component based on a recording list. In the recording list, different recording processors are allocated to the consecutive broadcast programs on the predetermined channel.

With the above configuration, the tuner can receive the broadcast programs, and the recording component has a plurality of recording systems for a single tuner. When the acquisition component acquires information about the start time and the end time of the broadcast programs for each channel, the recording list for recording the broadcast programs is produced in which different recording systems are allocated to the consecutive broadcast programs for the predetermined channel. The controller records the broadcast programs with the recording component based on the recording list.

With the recording device, recording can be performed without producing a period in which recording is impossible between the consecutive broadcast programs, while avoiding an increase in cost of the recording device.

[1] In view of the state of the known technology and in accordance with a first aspect of the present invention, the recording device comprises a tuner, a memory, and a controller. The tuner is configured to receive broadcast programs. The memory is configured to records the broadcast programs via a plurality of recording paths between the tuner and the memory. The controller is configured to use at least two of the recording paths to record consecutive broadcast programs on a predetermined channel in the memory. An output of the tuner is inputted to both of the at least two of the recording paths.

When a plurality of recording paths (or recording systems) are provided internally, in recording a plurality of consecutive broadcast programs on a certain channel, the broadcast programs are recorded with different recording paths. A prior broadcast program is recorded from the start to the end with one recording path. A subsequent broadcast program is also recorded from the start to the end, using a different recording path. Consequently, there is no period in which recording is intermittent between the consecutive broadcast programs.

[2] In accordance with a preferred embodiment according to any one of the recording devices mentioned above, the controller is configured to use the at least two of the recording paths to record a first broadcast program and a second broadcast program in the memory when an end time of the first broadcast program coincides with a start time of the second broadcast program on a predetermined channel.

[3] In accordance with a preferred embodiment according to any one of the recording devices mentioned above, the controller is configured to record at least one of the consecutive broadcast programs in the memory while changing a predetermined recording mode of the at least one of the consecutive broadcast programs.

[4] In accordance with a preferred embodiment according to any one of the recording devices mentioned above, when predetermined recording modes of two consecutive broadcast programs are a compressed recording mode, the controller is configured to maintain the predetermined recording mode of one of the two consecutive broadcast programs, and configured to change the predetermined recording mode of the other one of the two consecutive broadcast programs to a direct recording mode.

[5] In accordance with a preferred embodiment according to any one of the recording devices mentioned above, the controller is configured to execute a post-conversion processing to the at least one of the consecutive broadcast programs.

[6] In accordance with a preferred embodiment according to any one of the recording devices mentioned above, the controller is configured to acquire information about a start time and an end time for each of the broadcast programs for each channel. The controller is configured to record the consecutive broadcast programs in the memory with the at least two of the recording paths based on a recording list in which the at least two of the recording paths are allocated for the consecutive broadcast programs on the predetermined channel.

With the above configuration, the tuner can receive the broadcast programs, and the plurality of recording paths are provided for the single tuner. When the controller acquires information about the start time and the end time for each of the broadcast programs for each channel, the recording list is produced in which the different recording paths are allocated to the consecutive broadcast programs for the predetermined channel, and recording is performed. The controller records the broadcast programs with the recording paths based on the recording list.

[7] In accordance with a preferred embodiment according to any one of the recording devices mentioned above, the controller is configured to acquire program list information for the predetermined channel, and configured to record the consecutive broadcast programs on the predetermined channel in the memory based on the recording list in which the consecutive programs are allocated to the at least two of the recording paths based on the program list information for the predetermined channel.

[8] In accordance with a preferred embodiment according to any one of the recording devices mentioned above, the controller is configured to update the recording list based on the program list information for a plurality of channels at a predetermined time interval.

[9] In accordance with a preferred embodiment according to any one of the recording devices mentioned above, the controller is configured to set the predetermined time interval for updating the recording list according to a number of the broadcast programs for a predetermined time period based on the program list information for the plurality of channels.

[10] In accordance with a preferred embodiment according to any one of the recording devices mentioned above, when a sum of the number of the broadcast programs for the predetermined time period and a number of the broadcast programs that are currently scheduled exceeds a predetermined range, the controller is configured to reduce the predetermined time period for the sum to fall within the predetermined range.

[11] In accordance with a preferred embodiment according to any one of the recording devices mentioned above, the controller is configured to set the predetermined time period to be less than or equal to the predetermined time interval.

[12] In accordance with a preferred embodiment according to any one of the recording devices mentioned above, when an end time of a first broadcast program coincides with a start time of a second broadcast program on a predetermined channel, the controller is configured to produce the recording list in which the first broadcast program and this second broadcast program are allocated to the at least two of the recording paths.

[13] In accordance with a preferred embodiment according to any one of the recording devices mentioned above, the recording list includes information about a recording mode and information about whether or not to change the recording mode upon completion of recording.

[14] In accordance with a preferred embodiment according to any one of the recording devices mentioned above, the controller is configured to record at least one of the consecutive broadcast programs in the memory without changing a predetermined recording mode of the at least one of the consecutive broadcast programs.

[15] In accordance with a preferred embodiment according to any one of the recording devices mentioned above, the recording device further comprises a decoder/encoder that is configured to decode or encode the broadcast programs on one of the recording path.

[16] In view of the state of the known technology and in accordance with a second aspect of the present invention, a recording method comprises listing broadcast programs on a predetermined channel in a predetermined time slot within a predetermined time period after a current time, counting a number of broadcast programs that are currently scheduled in a recording list, reducing the predetermined time period for a sum of a number of the broadcast programs that have been listed and the number of broadcast programs that are currently scheduled to fall within a predetermined range when the sum exceeds the predetermined range, adding the broadcast programs that have been listed to the recording list in addition to the broadcast programs that are currently scheduled when the sum falls within the predetermined range, and recording the broadcast programs based on the recording list.

[17] In accordance with a preferred embodiment according to the recording method mentioned above, the recording method further comprises deleting from the recording list a broadcast program after completion of recording of the broadcast program.

[18] In accordance with a preferred embodiment according to the recording method mentioned above, the recording method further comprises updating the recording list after the predetermined time period has elapsed.

[19] In accordance with a preferred embodiment according to the recording method mentioned above, the recording method further comprises returning the predetermined time period to an initial value after the predetermined time period has elapsed.

[20] In accordance with a preferred embodiment according to the recording method mentioned above, the recording method further comprises producing the recording list in which a plurality of consecutive broadcast programs on the predetermined channel are allocated to at least two recording paths.

With the recording device mentioned above, recording can be performed without producing a period in which recording is impossible between the consecutive broadcast programs, while avoiding an increase in cost.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A recording device comprising:
a tuner that receives broadcast programs;
a controller with a plurality of input lines; and
a memory that records the broadcast programs obtained via a plurality of recording paths that are defined between the tuner and the memory through the controller, with the input lines of the controller partially forming the recording paths,
the controller using at least two of the recording paths to record consecutive broadcast programs on a predetermined channel in the memory,
an output of the tuner being inputted to both of the at least two of the recording paths,
the controller acquiring information about a start time and an end time for each of the broadcast programs for each channel,
the controller recording the consecutive broadcast programs in the memory with the at least two of the recording paths based on a recording list in which the at least two of the recording paths are allocated for the consecutive broadcast programs on the predetermined channel, the controller acquiring program list information for the predetermined channel, and recording the consecutive broadcast programs on the predetermined channel in the memory based on the recording list in which the consecutive broadcast programs are allocated to the at least two of the recording paths based on the program list information for the predetermined channel, the controller repeatedly updating the recording list based on the program list information for a plurality of channels at a recording list update cycle, the controller extracting, as target broadcast programs for scheduled recording, broadcast programs listed on the program list information for the plurality of channels within a range of a predetermined time period, the controller counting a first number of the target broadcast programs that has been extracted, the controller counting a second number of registered broadcast programs that are currently registered in the recording list, the controller determining whether a sum of the first number of the target broadcast programs and the second number of the registered broadcast programs exceeds a predetermined maximum number of broadcast programs that are registerable in the recording list for scheduled recording after excluding overlaps between the target broadcast programs and the registered broadcast programs, and in response to determining that the sum of the first number of the target broadcast programs and the second number of the registered broadcast programs exceeds the predetermined maximum number, the controller reducing a length of the predetermined time period until the sum of the first number of the target broadcast programs and the second number of the registered broadcast programs does not exceed the predetermined maximum number.

2. The recording device according to claim 1, wherein
an output signal of the tuner on a single channel is distributed into at least two of the input lines, the controller determining, at a timing of a scheduled registration confirmation processing, whether scheduled recordings of consecutive broadcast programs that include a first broadcast program and a second broadcast program subsequent to the first broadcast program and are broadcasted on the single channel are scheduled, the scheduled registration confirmation processing being performed before a start time of the second broadcast program, and the controller allocating, at a timing before the start time of the second broadcast program, the scheduled recordings of the consecutive broadcast programs to at least two of the recording paths, respectively, that include the at least two of the input lines, to independently record the consecutive broadcast programs that are broadcasted on the single channel in the memory based on the output signal distributed into the at least two of the input lines in response to determining, at the timing of the scheduled registration confirmation processing, that the scheduled recordings of the consecutive broadcast programs that are broadcasted on the single channel are scheduled, the controller allocating the scheduled recordings of the consecutive broadcast programs to the at least two of the recording paths, respectively, such that the consecutive broadcast programs are always recorded using different recording paths that are different from each other.

3. The recording device according to claim 2, wherein
the controller uses the at least two of the recording paths to record the first broadcast program and the second broadcast program in the memory when an end time of the first broadcast program coincides with the start time of the second broadcast program on the single channel.

4. The recording device according to claim 2, wherein
the controller records at least one of the consecutive broadcast programs in the memory while changing a predetermined recording mode of the at least one of the consecutive broadcast programs.

5. The recording device according to claim 4, wherein
when predetermined recording modes of two consecutive broadcast programs are a compressed recording mode, the controller maintains the predetermined recording mode of one of the two consecutive broadcast programs, and changes the predetermined recording mode of the other one of the two consecutive broadcast programs to a direct recording mode.

6. The recording device according to claim 4, wherein
the controller executes a post-conversion processing to the at least one of the consecutive broadcast programs.

7. The recording device according to claim 2, wherein
when an end time of the first broadcast program coincides with the start time of the second broadcast program on the single channel, the controller produces the recording list in which the first broadcast program and the second broadcast program are allocated to the at least two of the recording paths.

8. The recording device according to claim 2, wherein
the recording list includes information about a recording mode and information about whether or not to change the recording mode upon completion of recording.

9. The recording device according to claim 2, wherein
the controller records at least one of the consecutive broadcast programs in the memory without changing a predetermined recording mode of the at least one of the consecutive broadcast programs.

10. The recording device according to claim 2, further comprising
a decoder/encoder that decodes or encodes the broadcast programs on one of the recording paths.

11. The recording device according to claim 1, wherein
the controller sets the recording list update cycle to be less than or equal to the predetermined time period.

* * * * *